US008667019B2

(12) United States Patent
Mehra et al.

(10) Patent No.: US 8,667,019 B2
(45) Date of Patent: *Mar. 4, 2014

(54) PLACEMENT GOAL-BASED DATABASE INSTANCE CONSOLIDATION

(75) Inventors: Prem N. Mehra, Dallas, TX (US); (Lindsey) Lingzhi Allen, Bothell, WA (US); (Cindy) Xue Song, Redmond, WA (US); (Johnson Li) Li Zhaofu, Beijing (CN); Michael C. Thomassy, Norcross, GA (US)

(73) Assignee: Microsoft Corporation, Redmond, WA (US)

( * ) Notice: Subject to any disclaimer, the term of this patent is extended or adjusted under 35 U.S.C. 154(b) by 402 days.

This patent is subject to a terminal disclaimer.

(21) Appl. No.: 13/078,246

(22) Filed: Apr. 1, 2011

(65) Prior Publication Data

US 2012/0254434 A1    Oct. 4, 2012

(51) Int. Cl.
 *G06F 17/30*    (2006.01)
 *H04L 29/08*    (2006.01)

(52) U.S. Cl.
 CPC ..... *G06F 17/30286* (2013.01); *H04L 29/08072* (2013.01)
 USPC .......................................... 707/790; 709/201

(58) Field of Classification Search
 CPC ............................................... G06F 17/30286
 USPC .......................................... 707/790; 709/201
 See application file for complete search history.

(56) References Cited

U.S. PATENT DOCUMENTS

| | | | |
|---|---|---|---|
| 7,580,928 B2 * | 8/2009 | Wu et al. ................................ 1/1 |
| 7,725,559 B2 * | 5/2010 | Landis et al. ................. 709/215 |
| 7,769,843 B2 * | 8/2010 | Neuse et al. ................... 709/223 |
| 7,797,453 B2 * | 9/2010 | Meijer et al. ................... 709/246 |
| 7,987,203 B2 * | 7/2011 | Morris .......................... 707/793 |
| 8,103,704 B2 * | 1/2012 | Abrams ......................... 707/809 |
| 8,112,366 B2 * | 2/2012 | Hollingsworth et al. ........ 706/11 |
| 8,200,636 B2 * | 6/2012 | Hicks et al. ................... 707/661 |
| 2006/0020642 A1 * | 1/2006 | Hicks et al. ................... 707/204 |
| 2006/0107087 A1 * | 5/2006 | Sieroka et al. ..................... 714/4 |

(Continued)

OTHER PUBLICATIONS

Benjamin Speitkamp and Martin Bichler, "A Mathematical Programming Approach for Server Consolidation Problems in Virtualized Data Centers", Oct. 2010, IEEE Transactions on Services Computing, vol. 3, No. 4, pp. 266-278.*

(Continued)

*Primary Examiner* — Shahid Alam
*Assistant Examiner* — Nargis Sultana
(74) *Attorney, Agent, or Firm* — Kevin Sullivan; Kate Drakos; Micky Minhas

(57) ABSTRACT

Models and tools for facilitating database instance consolidation are described. One approach obtains standardized database instance performance data, receives instance isolation criteria which are applied to divide instances into sets, determines resource usage for each set, and assigns instance sets to target machines based on resource usage and capacity. Each instance set is associated with a virtual machine in some cases. A security isolation criterion indicates that specified instances shall not co-reside on a target machine; an organizational criterion indicates that specified instances shall be located together in a single data center; a compatibility criterion indicates that instances shall not reside in the same virtual machine, the same physical server, or the same server pool. Users iteratively reach an acceptable consolidation of instances at one or more data centers, such as an enhanced assignment of instances that is more efficient than a linear additive solution.

20 Claims, 4 Drawing Sheets

(56) References Cited

U.S. PATENT DOCUMENTS

| | | | |
|---|---|---|---|
| 2006/0179171 A1* | 8/2006 | Stefaniak et al. | 710/15 |
| 2007/0067435 A1* | 3/2007 | Landis et al. | 709/224 |
| 2007/0156902 A1* | 7/2007 | Becker | 709/226 |
| 2009/0013259 A1* | 1/2009 | Teichman | 715/738 |
| 2009/0037488 A1* | 2/2009 | Abrams | 707/201 |
| 2009/0070771 A1* | 3/2009 | Yuyitung et al. | 718/105 |
| 2010/0058347 A1* | 3/2010 | Smith et al. | 718/104 |
| 2010/0122270 A1* | 5/2010 | Lin | 719/318 |
| 2010/0205590 A1* | 8/2010 | Puchinger et al. | 717/153 |
| 2010/0333116 A1* | 12/2010 | Prahlad et al. | 719/328 |
| 2011/0246422 A1* | 10/2011 | Gonzalez | 707/634 |

OTHER PUBLICATIONS

Hsueh, et al., "SQL Server Consolidation Guidance", Retrieved at << http://www.msdn.microsoft.com/en-us/library/ee819082%28SQL. 100%29.aspx >>, Nov. 2009, pp. 19.

"Next-Generation Federal Data Center Architecture". Retrieved at << http://www.cisco.com/en/US/solutions/collateral/ns340/ns517/ns224/net_implementation_white_paper0900aecd805fbdfd.pdf >>, White Paper, Retrieved Date: Oct. 2010, pp. 1-12.

Curino, et al., "Relational Cloud: The Case for a Database Service", Retrieved at << http://www.mit.edu/~eugenewu/files/papers/caseforrelationalcloud.pdf >>, Computer Science and Artificial Intelligence Laboratory, Technical Report, MIT-CSAIL-TR-2010-014, Mar. 14, 2010, pp. 8.

Lee, et at., "Database Instance Caging: A Simple Approach to Serve", Retrieved at << http://www.oracle.com/technetwork/database/features/performance/instance-caging-wp-166854.pdf >>, White Paper, Sep. 2009. pp. 13.

"Chapter 26: Designing Hosted and Cloud Services", Retrieved at << http://msdn.microsoft.com/en-us/library/ee658110(d=printer).aspx, Retrieved Date: Mar. 9, 2011, pp. 19.

"Enterprise Data Management: ERP Instance Consolidation", Retrieved at << http://www.glassoc.com/sub_services.php?sid=19 >>, Retrieved Date: Mar. 9, 2011, pp. 1.

Ganore. "Hybrid Cloud Hosting 'Green' Future", Retrieved at << http://www.esds.co.in/blog/hybrid-cloud-hosting-green-future/ >>, Nov. 17, 2010, pp. 5.

Bonner, "Hybrid It—Optimizing The Cloud, Consolidating On-premise", Retrieved at << http://business.ezinemark.com/hybrid-it-optimizing-the-cloud-consolidating-on-premise-31f566942c6.html >>, Feb. 8, 2011, pp. 3.

Ahlen, "SQL Azure—why use it and what makes it different from SQL Server?". Retrieved at << http://blogical.se/blogs/jahlen/archive/2010/11/23/sql-azure-why-use-it-and-what-makes-it-different-from-sql-server.aspx >>, Nov. 24, 2010 , pp. 5.

"SQL Consolidation on the Private Cloud", Retrieved at << http://www.vmware.com/solutions/business-critical-apps/sql/consolidation.html >>. Retrieved Date: Mar. 19, 2011, pp. 2.

"Microsoft® Consolidation Planning Tool for SQL Server v1.0", Retrieved at << http://www.microsoft.com/downloads/en/details.aspx?FamilyID=eda8f544-c6eb-495f-82a1-b6ae53b30f0a&displaylang=en >>, Retrieved Date Nov. 2, 2010, pp. 2.

"Combinatorial optimization", Retrieved at << http://en.wikipedia.org/wiki/Combinatorial_optimization >>, Oct. 18, 2010, pp. 3.

"Dynamic programming", Retrieved at << http://en.wikipedia.org/wiki/Dynamic_programming >>, Oct. 19, 2010, pp. 12.

"Knapsack problem", Retrieved at http://en.wikipedia.org/wiki/Knapsack_problem#0-1_knapsack_problem >>, Oct. 24, 2010, pp. 6.

"List of knapsack problems", Retrieved at << http://en.wikipedia.org/wiki/List_of_knapsack_problems >>, Sep. 19, 2010, pp. 5.

"Packing problem", Retrieved at << http://en.wikipedia,org/wiki/Packing_problem >>, Sep. 27, 2010, pp. 9.

* cited by examiner

PLACEMENT GOAL-BASED DATABASE INSTANCE CONSOLIDATION

BACKGROUND

A database is a collection of data that is organized to facilitate access and updates to the data. Databases can be categorized according to the type of data they contain, such as bibliographic, numeric, textual, image, transactional, or other data, for example. Databases can also be categorized according to the organizational approach used, such as relational, hierarchical, object-oriented, and hybrid approaches, for example.

Databases are sometimes instantiated for use in different contexts, such as a development context in which new functionality is created, a pre-production context in which new functionality is tested before the database is released to production, and a production context in which the database stores live data and is commercially relied upon, for example. Databases may also be instantiated multiple times on multiple servers within a given context, to provide faster access and reliability through redundancy. A given database instance may include database management software, tables and other data-containing structures, indexes into the data, data access and/or manipulation procedures, memory resources, and other items. A database instance is sometimes called a database environment.

SUMMARY

Database administrators sometimes want to consolidate database instances, in order to make more efficient use of server hardware and/or for other reasons. However, instance consolidation may involve tedious and time-consuming manual calculations in an additive linear model, due to a lack of adequate multi-goal analysis models and tools to derive a solution in which database instances are efficiently consolidated to target servers as desired.

Some embodiments described herein provide models and tools for facilitating database instance consolidation. From a tool perspective, one approach involves obtaining standardized database instance performance data for database instances running on source machines, receiving at least one database instance isolation criterion from an administrator, applying the isolation criterion to automatically divide database instances into instance sets, determining a resource usage for each instance set, and automatically assigning instance sets to target machines based on instance set resource usage and target machine resource capacity.

In some embodiments, the isolation criteria may include a Security Factor, an Organizational Factor, and/or a Compatibility Factor. For example, a security criterion may be present indicating that specified instances shall not co-reside on a target machine, an organizational criterion may be present indicating that specified instances shall be located together in a single data center, and/or a compatibility criterion may be present indicating that some instances shall not reside in the same virtual machine, the same physical server, or the same server pool. Isolation criteria may be applied to guide the solution toward an acceptable consolidation of instances at one or multiple data centers.

In some embodiments, assigning instance sets to target machines may involve dynamic programming and/or combinatorial optimization, such as solving a 0-1 knapsack problem in which target machines are sorted by resource capacity, for example. Each instance set may be associated with a virtual machine, in which case assigning instance sets includes assigning virtual machines to target machines and determining resource usage includes finding a virtual machine resource usage for each virtual machine. Determining a resource usage for each instance set may involve rounding up to a multiple of a predetermined utilization unit.

From an administrator perspective, some embodiments include placement goal-based database instance consolidation which involves gathering database instance performance data for database instances running on source machines, standardizing the gathered performance data, entering into a user interface of a consolidation tool at least one database instance placement goal in the form of at least one isolation criterion, and identifying target machine characteristics to the consolidation tool. The tool may include a suitably programmed spreadsheet application, and/or other software. After commanding the consolidation tool to apply database isolation criteria to the standardized performance data and the target machine characteristics, the administrator gets from the tool an "enhanced assignment" of instances to target machines, namely, an assignment which is more resource efficient than an additive linear assignment.

In some embodiments, standardizing gathered performance data includes operations such as the following: setting a Needed Compute Unit to a Normalized CPU Capacity times a Processor Time Percentage; setting Needed Compute Unit to a Normalized CPU Capacity times a Processor Time Percentage times a multiplier which exceeds one; setting a Virtual Machine Compute Unit to a Target Machine Compute Unit divided by a Target Machine Number of Processors and times a Virtual Machine Number of Processors, when Virtual Machine Number of Processors does not exceed Target Machine Number of Processors; setting a Virtual Machine Compute Unit to a Target Machine Compute Unit when a Virtual Machine Number of Processors exceeds a Target Machine Number of Processors; and/or setting a Virtual Machine Memory Usage based on a Virtual Machine Startup Memory Allocation and a Virtual Machine Maximum Memory Allocation.

In some embodiments, an assignment of instances is gotten by the administrator from the consolidation tool for at least one of the following situations: source machines are treated as being located in multiple data centers and target machines are treated as being located in multiple data centers; source machines are treated as being located in multiple data centers and target machines are treated as being located in a single data center; source machines are treated as being located in a single data center and target machines are treated as being located in multiple data centers; source machines are treated as being located in a single data center and target machines are treated as being located in a single data center.

From an architectural perspective, some embodiments are configured to assist database instance consolidation using a logical processor, a memory in operable communication with the logical processor, database instance isolation criteria residing in the memory, and database instance consolidation code residing in the memory. The consolidation code is capable of automatically applying the isolation criterion to divide instances into instance sets, and is also capable of automatically assigning instance sets to target machines based on instance set resource usage and target machine resource capacity. Standardized database instance performance data may also reside in the memory, and the consolidation code may be capable of determining a resource usage for each instance set based on the performance data. The consolidation code produces in the memory an enhanced assignment of instances to target machines, which is more resource efficient than an additive linear assignment.

In some embodiments, the database instance consolidation code includes a spreadsheet program which is programmed to automatically assign instance sets to target machines based on instance set resource usage and target machine resource capacity. In some, the consolidation code is programmed to assign instance sets to target machines based on a solution of a 0-1 knapsack problem arising from the instance sets.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
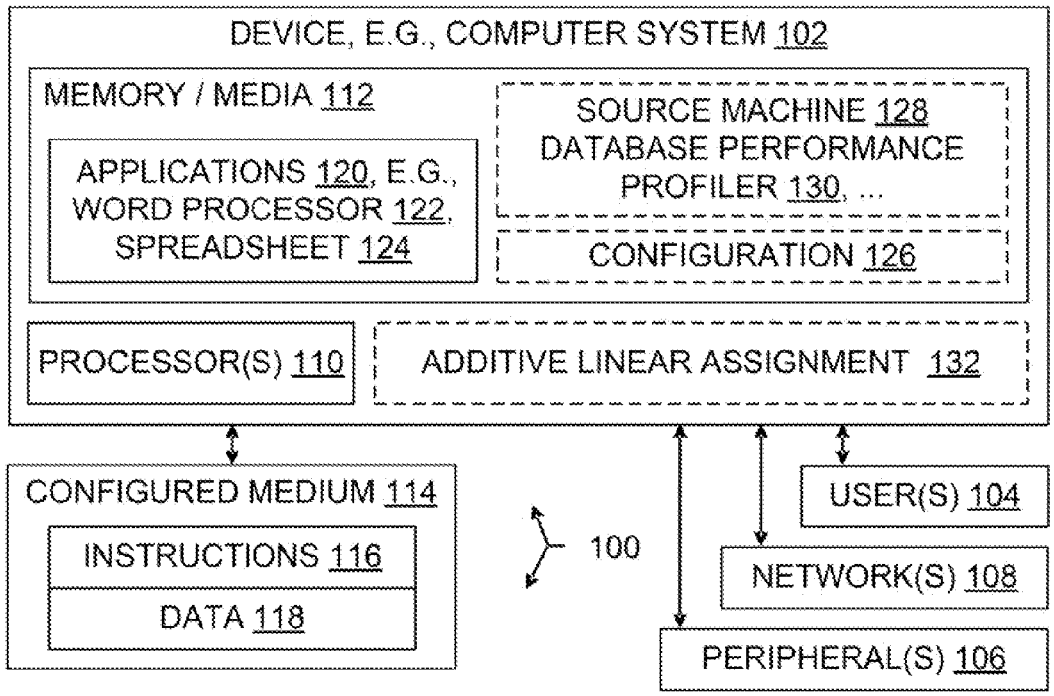
FIG. 1 is a block diagram illustrating a computer system having at least one processor, at least one memory, at least one application, and other items in an operating environment which may be present on multiple network nodes, and also illustrating configured storage medium embodiments.

Database instance consolidation may be a significant issue in various contexts. For example, changes in data center allocations, efforts to utilize cloud computing for database applications, and other enterprise activities may involve instance consolidation. A "one workload, one box" approach to server provisioning for database instances has often led to over-provisioning and underutilization of hardware assets. When utilization of servers in a data center is low, a large percentage of resources are idle, which in turn leads to increased cost of resources such as space, heating and cooling, and network infrastructure. In such cases, benefits may be available through virtualization of the data center, and consolidation of databases.

However, difficult challenges may hinder consolidation, particularly for large enterprises. In some situations, tedious and time-consuming calculation has been performed manually in a familiar effort to derive a solution specifying which database instances will be consolidated to which target servers, due to the lack of adequate analysis and calculation models and tools. But a single-goal simple compute model solution, in which calculations adhere to an additive linear model with a single goal, can be hard to reach. An additive linear approach often fails to reach an optimal consolidation solution, especially for an enterprise with dozens of servers.

In some familiar approaches, for example, a Database Administrator (DBA) working on a consolidation plan will manually arrange database instances by tentatively assigning them to a set of target servers based on major resource utilizations in candidate host servers. But this tentative arrangement is based on an additive linear model, making it difficult to reach an optimal solution. If the tentative assignment also fails to round up values in response to commercial hardware features, such as a 9-core CPU, significant waste may continue even after consolidation.

Some embodiments described herein use dynamic programming and/or other mathematical models, instead of the familiar linear model, to inform the implementation of database consolidation tools and techniques. Despite their underlying sophistication, some of these tool embodiments provide a relatively simple interface which allows general technical staff personnel (as opposed to experienced DBAs, for example) to effectively use the tool to aid database consolidation and to reduce the effort of database instance consolidation. Some embodiments provide a goal-based calculation model for enterprise-level customers, to help them consolidate their on-premises database instances to cloud or physical server pools.

In some embodiments, an analysis and calculation model is used which allows users to reach an optimal solution for a goal-based database instance consolidation from an on-premise platform to a cloud platform. In some, a placement-goal-based mathematical model is implemented both for consolidation to a single data center and for consolidation to multiple data centers. Some embodiments transform inputs such as database consolidation factors, performance data, and machine and resource characteristics into a 0-1 knapsack problem, such that familiar algorithms can then be applied to consolidate database instances in a single data center situation. Some embodiments transform the inputs such that dynamic programming can be applied to consolidate database instances for multiple data centers.

Some embodiments described herein may be viewed in a broader context. For instance, concepts such as standardization, performance data, isolation, instances, resource usage, and assignment may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and processes involving standardization, performance data, isolation, instances, resource usage, and assignment are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, scripts, macros, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

Throughout this document, use of the optional plural "(s)" means that one or more of the indicated feature is present. For example, "machine(s)" means "one or more machines" or equivalently "at least one machine".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "obtaining", "receiving", "applying", "assigning", "dividing", "accessing", "viewing", "deriving", "displaying", "collecting", "transmitting", "sending", "issuing", or "communicating" with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106. System/network administrators, database administrators (DBAs), developers, engineers, customers, and other end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The storage media 112 may be volatile memory, non-volatile memory, fixed in place media, removable media, magnetic media, and/or optical media, as opposed to media such as a wire that merely propagates a signal. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

Figure 2:
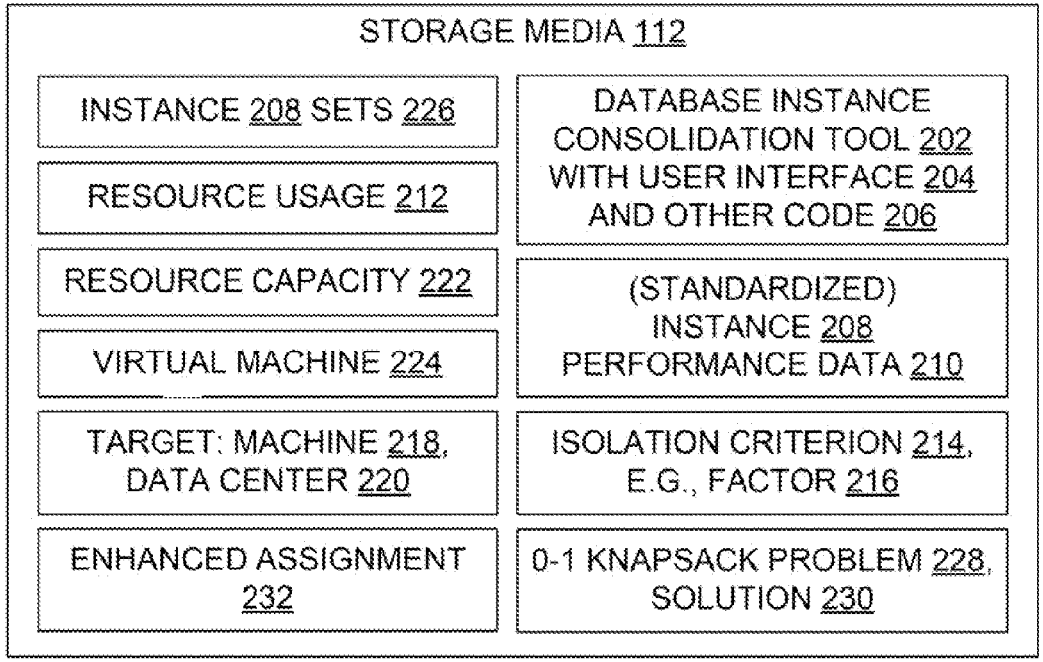
FIG. 2 is a block diagram illustrating some architectural aspects of placement goal-based database instance consolidation in some embodiments.
Figure 3:
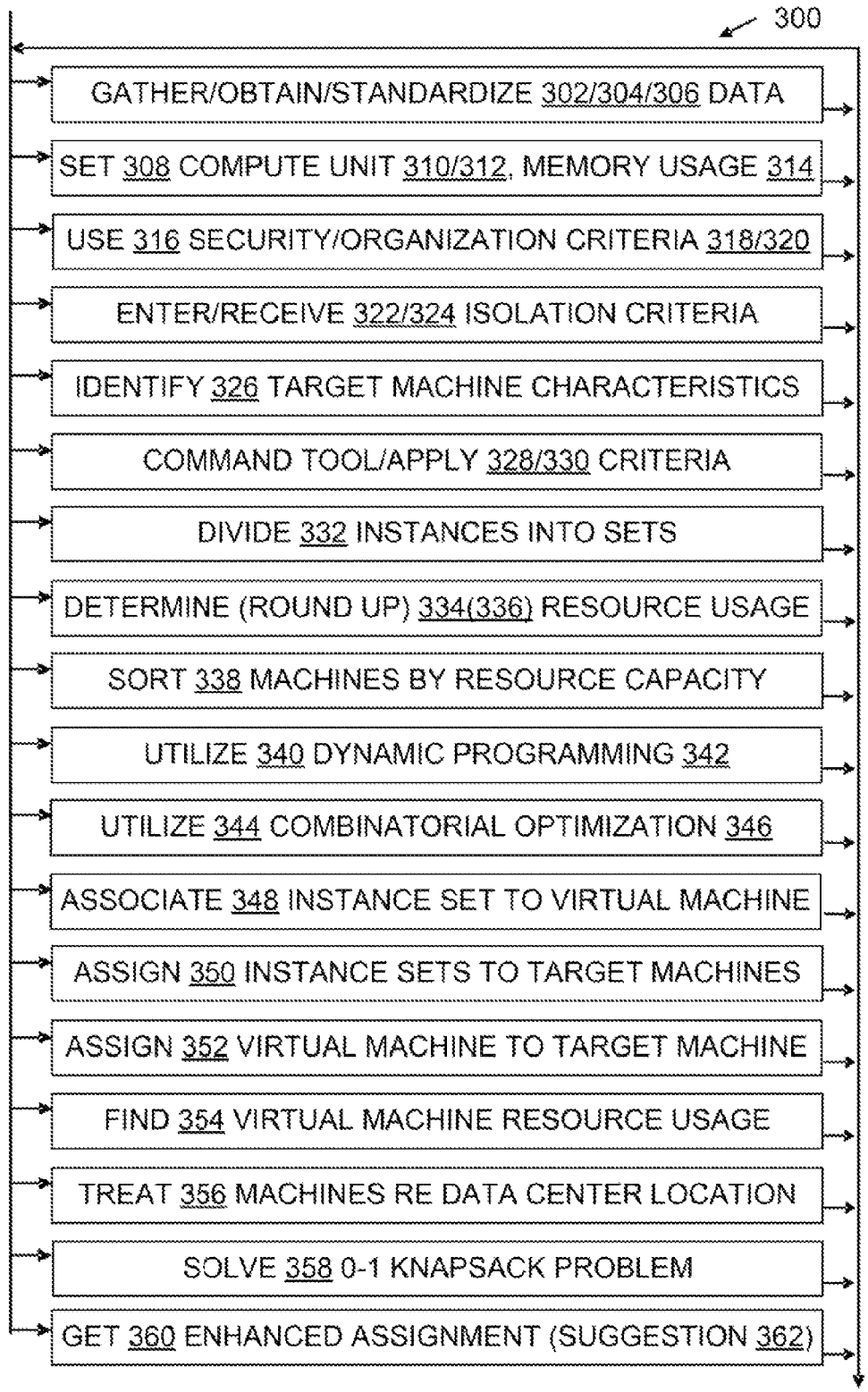
FIG. 3 is a low-level flow chart illustrating steps of some process and configured storage medium embodiments.

Some embodiments include a configured computer-readable storage medium 112. Medium 112 may include disks (magnetic, optical, or otherwise), RAM, EEPROMS or other ROMs, and/or other configurable memory devices, as opposed to propagated signal media. The storage medium which is configured may be in particular a removable storage medium 114 such as a CD, DVD, or flash memory. A general-purpose memory, which may be removable or not, and may be volatile or not, can be configured into an embodiment using items such as consolidation tools 202, isolation criteria 214, and enhanced assignments 232, in the form of data 118 and instructions 116, read from a removable medium 114 and/or another source such as a network connection, to form a configured medium. The configured medium 112 is capable of causing a computer system to perform process steps for transforming data through analysis of inputs and generation of suggestions 362 for database instance consolidation as disclosed herein. FIGS. 1 through 3 (and other Figures discussed below) thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by instance consolidation analysis as discussed herein, e.g., by standardizing, applying, dividing, assigning, rounding up, sorting, optimizing, solving, associating, binding, deployment, execution, modification, display, creation, loading, and/or other operations.

In addition to processor(s) 110 and memory 112, an operating environment may also include other hardware, such as displays, buses, power supplies, and accelerators, for instance.

Applications 120 such as a word processor 122 and spreadsheet 124, other software, and some other items shown in the Figures and/or discussed in the text may reside partially or entirely within one or more media 112, thereby configuring those media. A current configuration 126 description in a file or other data structure may be present, describing aspects of a current database instance configuration, such as which instances presently run on which servers. The database servers may be characterized and identified as source machines 128 for purposes of a consolidation effort. As part of a consolidation effort, data about the performance (utilization, efficiency, resource needs, latency, transaction loads, and so on) of the source machines may be gathered by a profiler 130. A proposed consolidation in the form of an additive linear assignment 132 of instances to machines, produced using familiar methods, may also be present.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

FIG. 2 illustrates aspects of an architecture which is suitable for use with some embodiments. A database instance consolidation tool 202 has a user interface 204, and has an engine or other code 206 which analyzes data and produces consolidation suggestions. Inputs to this consolidation tool 202 include information about database instances 208, such as their performance data 210, their current source machine 128 locations, and their resource usage 212, for example. Database "instance" performance data does not necessarily distinguish between database instances; some embodiments (system or process) use performance data which summarizes performance and resource usage at the machine level for all database instance(s) running on a given machine. The consolidation tool 202 is also given one or more isolation criteria 214, in the form of default analyses, numeric factors 216, or both. The consolidation tool 202 also has data about target machines 218, target data center(s) 220, and their resource capacities 222, e.g., processing power, available memory, and/or other resources deemed pertinent. Resources may be analyzed in terms of virtual machines 224 which are then mapped to physical machines, possibly by way of a cloud computing management service.

In some embodiments, the consolidation tool 202 takes the inputs and divides the instances 208 into sets 226. Then the consolidation tool 202 uses approaches such as combinatorial optimization, dynamic programming, and/or transformation of inputs into a 0-1 knapsack problem 228, to generate a solution 230 which can be formatted to give the user an enhanced assignment 232 of database instances to target machines 218 and data center(s) 220.

With reference to FIGS. 1 and 2, some embodiments provide a computer system 102 with a logical processor 110 and a memory medium 112 configured by circuitry, firmware, and/or software to transform data about source machines, target machines, and database instances by goal-driven instance consolidation analysis and placement suggestion generation as described herein.

In some embodiments, a computer system 102 configured to assist database instance consolidation includes a logical processor 110, a memory 112 in operable communication with the logical processor, at least one database instance isolation criterion 214 residing in the memory, and database instance consolidation code 206 residing in the memory. The consolidation code 206 is capable of automatically applying the database isolation criterion to divide database instances 208 into instance sets 226. The code 206 is also capable of automatically assigning instance sets to target machines 218 based on instance set resource usage 212 and target machine resource capacity 222.

In some embodiments, the system 102 is further characterized by standardized database instance performance data 210 residing in the memory. In some, the database instance consolidation code 206 is also capable of determining a resource usage 212 for each instance set 226 based on the performance data 210.

In some embodiments, the database instance consolidation code 206 includes a spreadsheet 124 with certain programming. Specifically, the spreadsheet program is programmed to automatically assign instance sets 226 to target machines 218 based on instance set resource usage 212 and target machine resource capacity 222.

In some embodiments, the database instance consolidation code 206 is programmed to assign instance sets 226 to target machines 218 based at least in part on a solution 230 of a 0-1 knapsack problem 228; the 0-1 knapsack problem 228 arises at least in part from the instance sets 226.

In some embodiments, the system 102 is characterized in that an enhanced assignment 232 of instances 208 to target machines 218 resides in the memory. As used herein, an "enhanced assignment" is an assignment which is more resource efficient than an additive linear assignment.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, consolidation tool code 206 may be on multiple devices/systems 102 in a networked cloud, performance data 210 may be stored on yet other devices within the cloud, and the enhanced assignment 232 may configure the display on yet other cloud device(s)/system(s) 102.

Processes

FIG. 3 illustrates some process embodiments in a flowchart 300. Processes shown in the Figures may be performed in some embodiments automatically, e.g., by a consolidation tool 202 driven by data 210, criteria 214, and other information provided under control of a script or otherwise requiring little or no contemporaneous user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a performance data gathering step 302, a user (or an embodiment operating on behalf of a user) gathers performance data 210 about database instances. Step 302 may be accomplished using a profiler 130 or other mechanism, for example.

During a performance data obtaining step 304, an embodiment obtains performance data 210 about database instances. Data obtaining step 304 corresponds generally with data gathering step 302, except that step 302 is from a user perspective and step 304 is from a consolidation tool perspective. Step 304 may be accomplished by automatically invoking a profiler 130, by receiving the storage location of previously gathered 302 data 210, or by other mechanisms, for example.

During a performance data standardizing step 306, an embodiment or a user standardizes performance data 210 about database instances. Step 306 may be accomplished by normalizing resource information into predefined standard units, for resources such as CPU (a.k.a. processor) and memory.

During a setting step 308 which may be part of standardizing step 306, for example, a value may be set for a standard unit such as a physical machine's compute unit 310, a virtual machine's compute unit 312, or a machine's (physical or virtual) memory usage 314. Although some standard units may prove to be more convenient as a practical matter, a variety of standard units may be present in a given group of embodiments; standardization per se is more a focus of this step than any particular choice of standard unit.

During a particular isolation criterion type using step 316, an embodiment (or a user manipulating aspects of an embodiment) uses a particular type of isolation criterion 214, such as a security isolation criterion 214, 318 or an organizational isolation criterion 214, 320. For example, the criterion may be used by supplying it to a consolidation tool 202 or by applying it within a consolidation tool 202 to produce an enhanced assignment.

More generally, during an isolation criterion entering step 322, a user enters an isolation criterion 214 into a consolidation tool 202 user interface 204. During an isolation criterion receiving step 324, a consolidation tool 202 receives an isolation criterion 214 through its user interface 204. Keyboards, Graphical User Interfaces (GUIs), network transmissions, scripts, file reads, and other familiar mechanisms for entering/receiving values in a piece of software may be used.

During a target machine identifying step 326, a user identifies target machine characteristics to a consolidation tool 202. Such characteristics may include, for example, target machine resource capacity 222, target machine location by data center, and characteristics related to isolation criteria 214.

During a consolidation tool commanding step 328, a user commands a consolidation tool 202 to apply the information it has been given and provide a consolidation suggestion. Familiar user interface command mechanisms can be used.

During an information applying step 330, a consolidation tool 202 applies the isolation criteria 214 and other information it has been given, in an attempt to generate a consolidation suggestion, using dynamic programming, combinatorial optimization, and/or other mechanisms described herein.

During an instances dividing step 332, which may be part of applying step 330, an embodiment divides instances 208 into sets 226, by partitioning the instances according to isolation criteria 214 as described herein.

During a resource usage determining step 334, an embodiment determines a respective resource usage 212 for each instance set 226, based on performance data 210, but in view of standardization 306, and possibly also rounding up 336.

During a rounding up step 336, an embodiment rounds up resource values, based on information about target machines 218, such as by rounding up to reflect the number of processor cores on a multi-core server.

During a sorting step 338, an embodiment sorts machines by their respective resource capacity 222. Any familiar sorting mechanism (bubble sort, insertion sort, quick sort, etc.) may be used in a given embodiment.

During a dynamic programming utilizing step 340, an embodiment uses dynamic programming 342 (as opposed to mere additive linear calculations) to generate a database instance consolidation suggestion.

During a combinatorial optimization utilizing step 344, an embodiment uses combinatorial optimization 346 (as opposed to mere additive linear calculations) to generate a database instance consolidation suggestion.

During a set-to-VM associating step 348, an embodiment associates an instance set 226 with a virtual machine 224, while generating a database instance consolidation suggestion.

During an instance set assigning step 350, an embodiment assigns instance sets 226 to target machines 218 as part of a database instance consolidation suggestion. If the consolidation suggestion is sufficiently efficient, it can then be presented in a formatted manner (e.g., printed or otherwise displayed table or list) to a user as an enhanced assignment 232.

During a VM-to-target assigning step 352, an embodiment assigns virtual machines 224 to target machines 218 as part of a database instance consolidation suggestion.

During a VM resource usages finding step 354, an embodiment finds value(s) for CPU, Memory, and/or other resource usage(s) of virtual machines 224, based on inputs provided by a user, a data file, programmed defaults, and/or other source.

During a machine location treating step 356, an embodiment treats specified machine(s), such as source machines 128 and/or target machines 218, as being located in one data center or multiple data centers, according to isolation criteria 214 received.

During a knapsack problem solving step 358, an embodiment solves a 0-1 knapsack problem 228, using familiar techniques for solving such problems.

During an enhanced assignment getting step 360, a user gets from a consolidation tool 202 an enhanced assignment 232 or other suggestion 362 for consolidating database instances to target machines 218.

The foregoing steps and their interrelationships are discussed in greater detail below, and elsewhere herein, in connection with various embodiments.

From a tool perspective, some embodiments provide a process for facilitating database instance consolidation. The process includes obtaining 304 standardized database instance performance data 210 for database instances 208 running on source machines 128, receiving 324 at least one database instance isolation criterion 214, applying 330 at least one received database isolation criterion to automatically divide 332 database instances into instance sets 226, determining 334 a resource usage 212 for each instance set (which may include rounding up 336 to a multiple of a predetermined utilization unit), and automatically assigning 350 instance sets to target machines based on instance set resource usage and target machine resource capacity. Assignment 350 may include sorting 338 target machines by resource capacity, may utilize 340/344 dynamic programming 342 and/or combinatorial optimization 346, and may involve solving 358 a 0-1 knapsack problem 228.

In some embodiments, at least one of the following is received as an isolation criterion 214: a security isolation criterion 318 indicating that specified instances shall not co-reside on a target machine, an organizational isolation criterion 320 indicating that specified instances shall be located together in a single data center.

In some embodiments, the process associates 348 each instance set 226 with a virtual machine 224, and assigning 350 instance sets includes assigning 352 virtual machines 224 to target machines 218. In some, determining 334 a resource usage for each instance set includes finding 354 a virtual machine resource usage 212 for each virtual machine.

From a user perspective, some embodiments provide a process for placement goal-based database instance consolidation. The process includes gathering 302 database instance performance data 210 for database instances 208 running on source machines 128, standardizing 306 gathered performance data, entering 322 into a user interface of a consolidation tool 202 at least one database instance placement goal in the form of at least one isolation criterion 214, identifying 326 target machine characteristics to the consolidation tool, commanding 328 the consolidation tool to apply one or more database isolation criteria to the standardized performance data and the target machine characteristics, and getting 360 from the consolidation tool an enhanced assignment 232 of instances to target machines (an assignment which is more resource efficient than an additive linear assignment). Steps may be assisted by tools, such as profilers 130, spreadsheets 124, and other software.

In some embodiments, standardizing 306 gathered performance data includes at least one of the following: setting 308 a Needed Compute Unit 310 to a Normalized CPU Capacity times a Processor Time Percentage, setting 308 a Needed Compute Unit 310 to a Normalized CPU Capacity times a Processor Time Percentage times a multiplier which exceeds one, setting 308 a Virtual Machine Compute Unit 312 to a Target Machine Compute Unit divided by a Target Machine Number of Processors and times a Virtual Machine Number of Processors when Virtual Machine Number of Processors does not exceed Target Machine Number of Processors, setting 308 a Virtual Machine Compute Unit 312 to a Target Machine Compute Unit when a Virtual Machine Number of Processors exceeds a Target Machine Number of Processors, setting 308 a Virtual Machine Memory Usage 314 based on a Virtual Machine Startup Memory Allocation and a Virtual Machine Maximum Memory Allocation.

In some embodiments, entering 322 includes entering at least one isolation criterion 214 into a spreadsheet program, and the spreadsheet program serves as at least a portion of the user interface 204 of the consolidation tool 202; programming in the spreadsheet 124 may also serve as at least a portion of the consolidation code 206 that analyzes inputs and provides enhanced assignments 232.

In some embodiments, the code 206 treats 356 machines in specified ways as to data center location. For example, in some cases users get 360 an assignment of instances for at least one of the following situations: source machines are treated 356 as being located in multiple data centers and target machines are treated 356 as being located in multiple data centers, source machines are treated 356 as being located in multiple data centers and target machines are treated 356 as being located in a single data center, source machines are treated 356 as being located in a single data center and target machines are treated 356 as being located in multiple data centers, source machines are treated 356 as being located in a single data center and target machines are treated 356 as being located in a single data center.

In some embodiments, a user enters 322 (and the tool thus receives 324) at least one isolation criterion 214 which is based on at least one of the following: a Security Factor 216, an Organizational Factor 216, a Compatibility Factor 216. In particular, a user may enter 322 a Security Factor 216 or other security isolation criterion 318 which indicates that specified instances 208 shall not co-reside on a target machine 218. A user may also enter 322 an Organizational Factor 216 or other organizational isolation criterion 320 which indicates that specified instances 208 shall be located together in a single data center.

Configured Media

Some embodiments include a configured computer-readable storage medium 112. Medium 112 may include disks (magnetic, optical, or otherwise), RAM, EEPROMS or other ROMs, and/or other configurable memory, including in particular non-transitory computer-readable media (as opposed to wires and other propagated signal media). The storage medium which is configured may be in particular a removable storage medium 114 such as a CD, DVD, or flash memory. A general-purpose memory, which may be removable or not, and may be volatile or not, can be configured into an embodiment using items such as consolidation tools 202, isolation criteria 214, and enhanced assignments 232, in the form of data 118 and instructions 116, read from a removable medium 114 and/or another source such as a network connection, to form a configured medium. The configured medium 112 is capable of causing a computer system to perform process steps for transforming data through analysis of inputs and generation of suggestions 362 for database instance consolidation as disclosed herein. FIGS. 1 through 3 (and other Figures discussed below) thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

ADDITIONAL EXAMPLES

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from documentation for a prototype consolidation tool implemented by Microsoft® Corporation. Aspects of the prototype program, its usage, and/or its documentation are consistent with or otherwise illustrate aspects of the embodiments described herein. However, it will be understood that prototype documentation and/or implementation choices do not necessarily constrain the scope of such embodiments, and likewise that the prototype and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

The tool helps customer identify instances that can co-reside on a server based on their CPU consumption. To identify instances to be consolidated, the prototype starts with Microsoft® Assessment and Planning toolkit (MAP) output, and merges it with user-provided characteristics of the instance. The prototype uses CPU Compute Units to estimate projected contributing load on the target server, and identifies candidate instances that can coexist on the target server. MAP is an example of a profiler 130.

Figure 4:
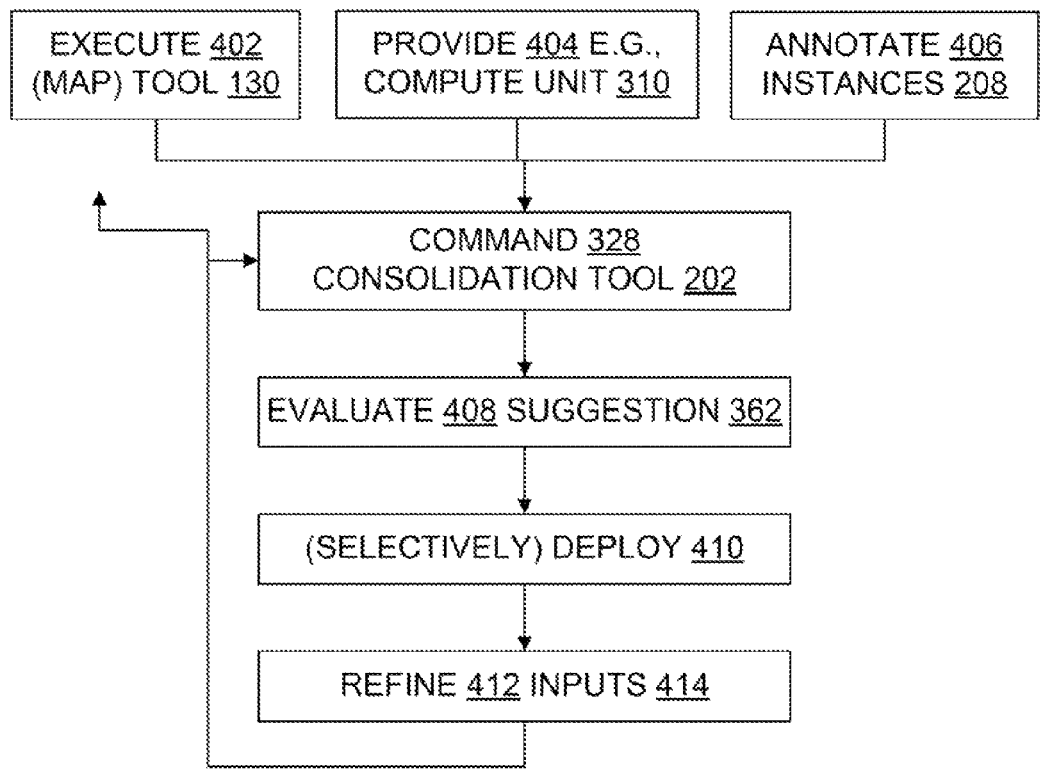
FIG. 4 is a high-level flow chart illustrating steps of some process and configured storage medium embodiments.

FIG. 4 illustrates a high level flow. A user executes 402 MAP or another profiler tool 130. For each server type, the user also provides 404 a Compute Unit 310, based for example on spec dot org SPEC CPU 2006 results or some other benchmarks. For each instance 208, the user also annotates 406 the instance with a degree of eligibility (a.k.a. isolation criterion 214) for consolidation, based for example on organizational and technical considerations. The user executes the tool 202 by commanding 328 it to apply the eligibility information to the instance and performance data, and gets 360 in response a consolidation suggestion 362 from the tool. The user evaluates 408 the results, which may include an enhanced assignment 232 or less desirable results, and selectively deploys 410 the suggestion by relocating instances. This deployment provides additional data, which allows the user to refine 412 the isolation criteria 214, performance data 210, and other inputs 414. Refinement may be followed by repeated MAP execution 402, input provision 404, and/or annotation 406, and/or by other steps described herein, although for clarity of illustration FIG. 4 only shows an iterative loop back to commanding step 328.

In some versions, the tool 202 takes information about CPU, disk space, I/O capacity, and memory as inputs, and provides instance consolidation suggestions as output. For example, inputs 414 may include: machine specification data such as total memory, CPU compute power capacity, and so on; utilization data such as CPU and memory utilization data; user-specified input such as business and technical factors; and specifications of the target server types. Output suggestions 362 may include information as to which source instances can co-exist on a target (a.k.a. destination) server, the total number of target servers needed, and the number of target server pools, for example.

One of the many possible examples of input is shown below:

CPU: Intel® Xeon® 3.0 GHz (marks of Intel Corporation)
Memory: 8 GB
Diskspace: 512 GB
Network Speed: 100M/S
Processor Time %: 10
Destination pool: P In some versions, the tool 202 imports MAP output data (e.g., Microsoft® Excel® files), possibly after that data is edited by the user. In some, the user can edit tool output suggestions 362 and then re-import the edited output as input 414 for a new iteration; that is, the input and output formats are consistent with each other and compatible.

In some versions, if no target servers are specified, the tools defaults to some value, e.g., a 16-core server.

Some versions maintain a Tracking Spreadsheet, namely, an on-going journal or a log, with tool 202 updates with values to provide lineage, run number, run time date and time, input and output sheet names, who ran the report, run duration, and so on.

As a Processing Phase example, assume the following:

Target Server Computer Unit (CU) is 200 as specified on SPEC CPU2006.

Source Server instance 1 (SSI 1) CU is 20 from SPEC CPU2006 and it is 10% utilized (from MAP).

Source Server instance 2 (SSI 2) CU is 40 from SPEC CPU2006 and it is 20% utilized (from MAP).

Processing normalizes the instances CPU utilization, then computes Normalized CUs (NCUs) as follows.

Target Server NCU 100. The Normalization Factor is 0.5 (100/200=0.5).

SS I 1 is NCU 10 (20×0.5) and its load contribution is 1 (10×10%) if it were to execute on the Target Server.

SS I 2 is NCU 20 (40×0.5) and its load contribution is 4 (20×20%) if it were to execute on the Target Server.

Assuming 60% as the goal set by the installation, 12 such sets (I1 and I2) can be hosted on the Target Server, i.e., 24 instances.

The selection of the specific instances which add up to 60% utilization is guided by the Organizational and Technical attribute values (isolation criteria 214) assigned by the installation.

An Output Phase identifies blocks of instances that are candidates for evaluation and consolidation on various Target Servers, producing as output a spreadsheet in the format and content that is usable by the installation as the input for the next run of the tool. This version of the tool adds the appropriate entries in the Tracking Spreadsheet for the run (tracking, lineage).

The following observations are also provided, subject to the same caveats as the discussion above.

In some versions, instead of relying on manual calculations a user can use a tool which is implemented based on the model discussed herein to provide the recommended solution, starting from performance gathering. Performance data gathering can be performed by a profiler such as MAP (Microsoft®Assessment and planning toolkit). This profiler tool accesses a customers' infrastructure environment and gathers performance data of database instances from the running candidate machines 128, including CPU utilization, memory utilization, I/O throughput, and network I/O throughput. The step of gathering data may last several weeks or months.

Secondly, gathered information standardizing occurs. All gathered major resource information from different types of candidate servers will be normalized into standard units of this kind of resource, and the hardware configuration of target servers will be normalized into standard units as well. Referring to the data gathered from the practical environment, there are some formulas from practical experience of Microsoft® SQL Server® instance consolidation (marks of Microsoft Corporation) as follows:

Candidate's Needed Compute Unit=(Normalized CPU capacity)*ProcessorTime %.

Candidate's Needed Compute Unit in VM scenario= (Compute Unit)*ProcessorTime %*(1+10%).

Candidate's Needed Memory=Data from information gathering tool (e.g., MAP).

As to the Virtual Machine's Compute Unit: If the VM's Number of virtual processors<=Number of processors on the physical machine, then VM's CU=(Physical machine's total CU)/(Number of processors)*(Number of virtual processors). Otherwise, VM's CU=Physical machine's total CU.

Virtual Machine's Memory=((start up+max)/2+max)/2, where start up/max refers to the start up/maximum memory allocated to the VM).

Target Server's Total Compute Unit=(Compute Power) (Maximum Utilization)*(Number of Processors).

Thirdly, algorithmic category selection occurs. In this model, an algorithmic category will automatically be chosen based on the data center consolidation goals specified by the user in the user interface, which leads to the optimal solution subject to other conditions.

One data center goal. A single data center goal, also sometimes called instance consolidation, means that all the database instances can be merged together without consideration of isolations from each other. Assuming the instance S1, S2 ... Sn are to be merged to the target server T (with capacity C), a problem is how to pick the instances to maximize the usage of the Target Server. That is, one seeks to minimize the cost function:

$$C = \Sigma_{k=1}^{k=n} S_k \quad (1)$$

In the cost function (1), $S_k$ is the capacity of the instances, and 1 to n is the numeric range of instances which are picked up. Minimizing the cost function indicates that the Target Server is maximally used.

Figure 6:
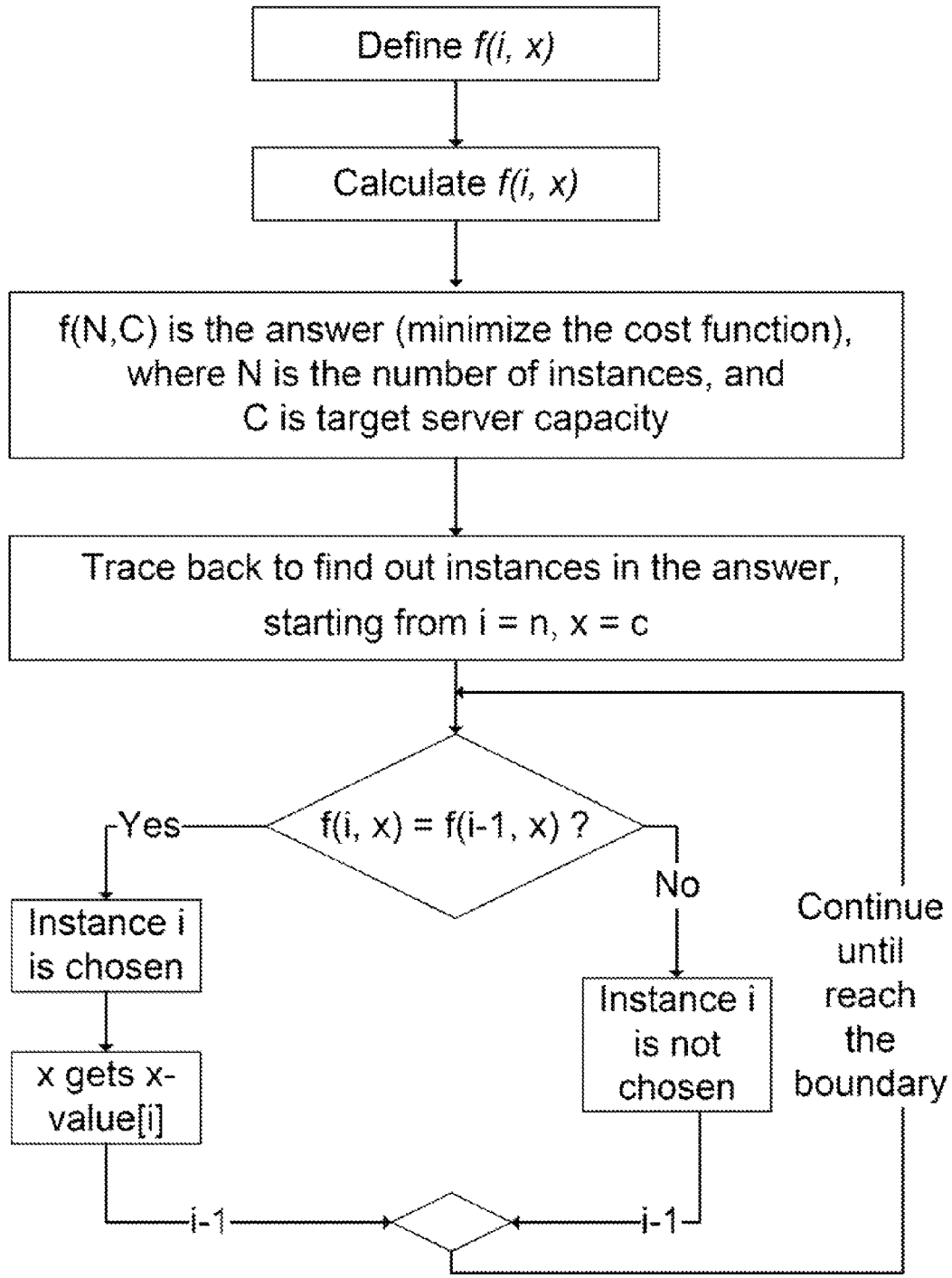
FIG. 6 is a flow chart illustrating steps of some process and configured storage medium embodiments for a placement goal-based database instance consolidation which targets a single data center.

In some versions, the problem is transformed into a 0-1 knapsack problem 228, and the code 206 flow shown in FIG. 6 is performed. If the tool is given multiple target servers, then descending sorting by capacity of available target servers is performed to get a target server array P[ ]. By considering the array element in the same sequence as an array index to pick up the candidate, for each current element, one obtains another 0-1 knapsack problem. Considering a larger target server to have a higher priority and combining with the algorithm for 0-1 knapsack problem solution helps ensure that a minimum number of target servers is used and that each target server is maximally used.

Multiple data centers goal. A multiple data center goal means that mutual isolation of part or all of the database instances is considered when merging instances to target servers. This model implicates one or more of the following scenarios: considering security factors, some database instances cannot co-reside at the same target server; considering organizational factors, some instances must be located in specified data centers; considering compatibility factors, it will not be suggested that some instances be located at the same virtual machine or physical server or pool.

Isolation factor(s) 216 can be used to describe the isolation, in which instances are subject to mutual isolation because of technology or business considerations, stated as factors. The calculation of a factor 216 can be customized. In some cases it is expressed as (business factor)*(tech factor). Only the instances with the same isolation factor can be consolidated into the same virtual machine; the instances with a default isolation factor can be consolidated into any virtual machines. An extreme case is that all database instances need to be isolated each other. This consolidation will become the VM (virtual machine) Consolidation, which is also the simplest consolidation mode.

Assume the instances S1, S2 ... Sn are to be merged to the target server T (with capacity C), with instances picked to maximize the usage of the Target Servers. One version of code 206 operates as follows.

First, divide 332 the candidate instances into different sets according to isolation factor. For each instance set 226, use one virtual machine 224 to hold it, thus one gets a virtual machine array expressed as V1, V2, ... Vn.

Second, use a normalized standard to indicate resource usage 212 of each virtual machine set. As to the CPU usage, for instance, normalize the compute capacity and percentage usage by an instance into compute units, then round up to the standard utilization.

Third, sort 338 the available physical servers in a descending order by capacity to get a physical array P[ ]. Consider the array element in the same sequence as an array index to pick up the candidate virtual machine. For each current element, this again defines a 0-1 knapsack problem, to make sure each target is maximally used.

Fourth, produce the solution meeting the specified goals.

Figure 5:
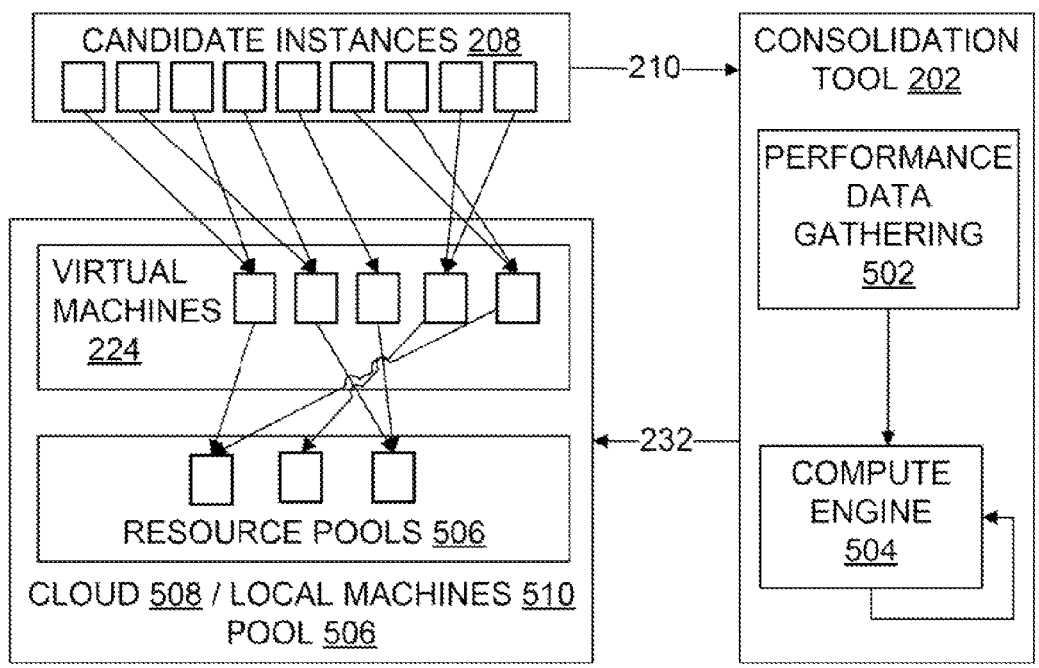
FIG. 5 is a data flow diagram illustrating placement goal-based database instance consolidation in some embodiments.

FIG. 5 illustrates a high-level architecture present in some embodiments. A consolidation tool 202 in the model includes a Performance Information (Data Gathering 502) portion and a Compute Engine 504 portion. The Performance Data Gathering portion will gather the performance data 210 of major resources consumed by the candidate database instances 208, such as CPU utilization, memory utilization, I/O throughput, network throughput, and so on. The Compute Engine 504 will pick a specific consolidation suggestion algorithm based on the goal specified by customers and compute a solution 230 (leading to an enhanced assignment 232) that is based on the goal specified by customer and the consuming data 210 collected. A refine and re-execute iterative process can be used, as customers can adjust the isolation factors 216 and resource pools 506 to reach the ultimate solution with some compromises in factors the customer deems acceptable. Resource pools may include cloud 508 machines and/or local machines 510.

FIG. 6 illustrates an implementation algorithm flow for one data center, transformed for solution as a 0-1 knapsack problem 228. Given the Target Server can hold capacity C (package capacity), instance i will cost weight[i] of capacity (weight). The value of instance (value[i]) is set equal to its cost (equal to weight[i]). The collection of instances for which the total cost is as large as possible, within the given Server capacity C, shall be chosen because in this case, the utilization of Server capacity has reached the maximum. The maximum value function can be written as:

$$f(i,x) = \max\{f(i-1, x-\text{weight}[i]) + \text{value}[i], f(i-1, x)\}, \text{ for } x > \text{weight}[i]$$

More generally, f(i, x) is defined as the maximum value that can be attained with weight less than or equal to x using items up to i.

An implementation algorithm for multiple data centers may flow as follows:

Divide 332 the candidate instances into different sets according to the isolation factor(s).

Allocate a virtual machine 224 for each set and get the virtual machine array V1, V2, ... Vn (associate 348 sets with virtual machines).

Round up 336 to get the usage 212 of major resources for each virtual machine, and get the capacity array C1, C2, ... Cn Sort 338 the physical servers (or the elements in the resource pool(s)) according to their capacity 222 and get the sorted array P1, P2, ... Pm.

Consider the elements in array P[ ], the sequence is P1, P2, ... PM, the same as their index. For each element, pick up the instances which will maximize use of the server, thus transforming this determination to the same problem addressed in FIG. 6.

Now consider an example illustrating the foregoing techniques. Only the Compute Unit of CPU is considered as a criterion for consolidation, but other resources can be processed in a similar way. The given placement goal is to consolidate all the candidate database instances to target servers. As to gathered performance data, the following table contains the measured performance data of candidate instances that were collected from a live enterprise environment. Note that only the instance with the same isolation factor can be merged into one virtual machine. The column of Compute Unit illustrates the standardized CPU usage of candidate database instances. For convenience in table formatting, in all the tables "CPU" stands for "Processor".

| ID | Host Name | % CPU Time | Total Memory (MB) | Total Capacity (GB) | Compute Power | Isolation Factor | Compute Unit |
|---|---|---|---|---|---|---|---|
| 1 | CE4-05H-LEGACY.Fabrikam.COM | 2.31 | 9,583 | 15 | 14.7 | 1 | 0.33957 |
| 2 | CE4-05H-NT.Fabrikam.COM | 4.47 | 3,583 | 20 | 44.8 | 2 | 2.00256 |
| 3 | CE4P-3E32-R2-1.Fabrikam.COM | 1.17 | 10,056 | 25 | 127.8 | 5 | 1.49526 |
| 4 | CE4P-3E32-R2-2.Fabrikam.COM | 1.28 | 12,354 | 35 | 25.2 | 2 | 0.32256 |
| 5 | CE4P-3E64-R2-1.Fabrikam.COM | 7.28 | 32,765 | 30 | 18.9 | 3 | 1.37592 |
| 6 | CE4P-3E64-R2-2.Fabrikam.COM | 3.42 | 16,381 | 45 | 14.6 | 4 | 0.49932 |
| 7 | CE4P-3EIA64-01.Fabrikam.COM | 2.36 | 32,765 | 60 | 13.2 | 1 | 0.31152 |
| 8 | CE4P-8EIA64-01.Fabrikam.COM | 1.10 | 32,765 | 599 | 113.8 | 7 | 1.25180 |
| 9 | CE4P-8EIA64-01.Fabrikam.COM | 4.76 | 3,839 | 599 | 52.0 | 10 | 2.47520 |
| 10 | CE4P-XP32-SP3-1.Fabrikam.COM | 4.81 | 3,871 | 68 | 21.8 | 14 | 1.00048 |
| 11 | CE4P-XP32-SP3-2.Fabrikam.COM | 20.48 | 4,031 | 398 | 10.0 | 18 | 2.04800 |

-continued

| ID | Host Name | % CPU Time | Total Memory (MB) | Total Capacity (GB) | Compute Power | Isolation Factor | Compute Unit |
|---|---|---|---|---|---|---|---|
| 12 | CE4P-XP64-SP3-1.Fabrikam.COM | 1.27 | 2,047 | 58 | 23.9 | 19 | 0.30353 |
| 13 | CE4P-XP64-SP3-2.Fabrikam.COM | 2.71 | 2,039 | 48 | 23.9 | 20 | 0.64769 |
| 14 | CE4V-3E32-DE.Fabrikam.COM | 1.85 | 3,806 | 329 | 131.7 | 15 | 2.43645 |
| 15 | CE4V-3E32-JA.Fabrikam.COM | 4.13 | 3,838 | 329 | 31.7 | 2 | 1.30921 |
| 16 | CE4V-3E32-KO.Fabrikam.COM | 1.94 | 4,030 | 68 | 83.6 | 16 | 1.62184 |
| 17 | CE4V-3E32-PT-BR.Fabrikam.COM | 5.03 | 4,030 | 428 | 32.8 | 12 | 1.64984 |
| 18 | CE4V-3E32-R2-1.Fabrikam.COM | 1.21 | 4,030 | 98 | 131.7 | 8 | 1.59357 |
| 19 | CE4V3E32R2S2-1.Fabrikam.COM | 2.40 | 4,030 | 50 | 62.5 | 13 | 1.50000 |
| 20 | CE4V3E32R2S2-2.Fabrikam.COM | 2.01 | 3,051 | 359 | 31.7 | 11 | 0.63717 |
| 21 | CE4V-3E32-RTM-1.Fabrikam.COM | 1.49 | 3,051 | 359 | 72.3 | 9 | 1.07727 |
| 22 | CE4V-3E32-SP1-1.Fabrikam.COM | 7.06 | 3,566 | 68 | 14.3 | 12 | 1.00958 |
| 23 | CE4V-3E32-SP1-2.Fabrikam.COM | 1.05 | 3,566 | 418 | 131.7 | 3 | 1.38285 |
| 24 | CE4V-3E32-SP2-1.Fabrikam.COM | 3.34 | 3,566 | 348 | 51.7 | 18 | 1.72678 |
| 25 | CE4V-3E64-R2-1.Fabrikam.COM | 6.55 | 3,566 | 312 | 41.8 | 18 | 2.73790 |
| 26 | CE4V-3E64-R2-2.Fabrikam.COM | 1.52 | 1,982 | 349 | 60.8 | 9 | 0.92416 |
| 27 | CE4V3E64R2S2-1.Fabrikam.COM | 1.07 | 1,982 | 349 | 90.2 | 3 | 0.96514 |
| 28 | CE4V3E64R2S2-2.Fabrikam.COM | 2.25 | 4,014 | 68 | 23.9 | 18 | 0.53775 |
| 29 | CE4V3E64R2S2-3.Fabrikam.COM | 1.69 | 4,014 | 868 | 23.1 | 7 | 0.39039 |
| 30 | CE4V-3S32-R2-1.Fabrikam.COM | 1.97 | 511 | 320 | 10.7 | 13 | 0.21079 |
| 32 | CE4V3S32R2S2-2.Fabrikam.COM | 3.55 | 511 | 799 | 9.6 | 12 | 1.10016 |
| 33 | CE4V-3S32-RTM-1.Fabrikam.COM | 1.11 | 511 | 68 | 131.7 | 17 | 1.46187 |
| 34 | CE4V-3S32-SP1-3.Fabrikam.COM | 15.51 | 511 | 68 | 10.7 | 6 | 1.65957 |

As to target servers and configuration, the following table shows the available physical target servers in this example. The computing capacity of a target server is given by the product of its Compute Power, Maximum Utilization and Number of Processors. The sum of compute unit of the instances consolidated to the target server should not be greater than the capacity of target server. Note that the Maximum Utilization is limited to reserve a buffer against a scenario when all the instances consolidated reach their peaks at the same time. Note that each virtual machine will have an over-head cost itself.

| Name | Model | CPU Speed (GHz) | # of CPUs | # of Cores | Maximum Utilization (%) | Compute Power |
|---|---|---|---|---|---|---|
| target1 | HP Integrity rx8640 (1.6 GHz/24 MB Dual-Core Intel Itanium 2) | 1.6 | 1 | 32 | 60 | 36.7 |
| target2 | Intel Core(TM) i7 CPU 920 @ 2.67 GHz, 64 bit | 2.7 | 1 | 32 | 60 | 30.2 |
| target3 | Intel Core(TM)2 Duo CPU E6750 @ 2.66 GHz, 32 bit | 2.67 | 1 | 32 | 60 | 21.3 |

A recommended solution using an additive linear model is shown in the following table. As illustrated, the result of a consolidation solution based on an additive linear model in this example will use all three target servers and the over-all compute unit cost is 52.90.

| Consolidation Recommendation | Virtual Machine | Host Name | Isolation Factor | Compute Unit |
|---|---|---|---|---|
| target1 | V1 | CE4-05H-LEGACY.Fabrikam.COM<br>CE4-05H-LEGACY.Fabrikam.COM | 1 | 0.65109 |
|  | V2 | CE4-05H-NT.Fabrikam.COM<br>CE4P-3E32-R2-2.Fabrikam.COM<br>CE4V-3E32-JA.Fabrikam.COM | 2 | 3.63433 |
|  | V3 | CE4P-3E64-R2-1.Fabrikam.COM<br>CE4V-3E32-SP1-2.Fabrikam.COM<br>CE4V3E64R2S2-1.Fabrikam.COM | 3 | 3.72391 |
|  | V4 | CE4P-3E64-R2-2.Fabrikam.COM | 4 | 0.49932 |
|  | V5 | CE4P-3E32-R2-1.Fabrikam.COM | 5 | 1.49526 |
|  | V6 | CE4V-3S32-SP1-3.Fabrikam.COM | 6 | 1.65957 |
|  | V7 | CE4P-8EIA64-01.Fabrikam.COM<br>CE4V3E64R2S2-3.Fabrikam.COM | 7 | 1.64219 |
|  | V8 | CE4V-3E32-R2-1.Fabrikam.COM | 8 | 1.59357 |
|  | V9 | CE4V-3E32-RTM-1.Fabrikam.COM<br>CE4V-3E64-R2-2.Fabrikam.COM | 9 | 2.00143 |
|  | V10 | CE4P-8EIA64-01.Fabrikam.COM | 10 | 2.4752 |
|  | V11 | CE4V3E32R2S2-2.Fabrikam.COM | 11 | 0.63717 |
| target2 | V12 | CE4V-3E32-PT-BR.Fabrikam.COM<br>CE4V-3E32-SP1-1.Fabrikam.COM<br>CE4V3S32R2S2-2.Fabrikam.COM | 12 | 3.75958 |
|  | V13 | CE4V3E32R2S2-1.Fabrikam.COM<br>CE4V-3S32-R2-1.Fabrikam.COM | 13 | 1.71079 |
|  | V14 | CE4P-XP32-SP3-1.Fabrikam.COM | 14 | 1.00048 |
|  | V15 | CE4V-3E32-DE.Fabrikam.COM | 15 | 2.43645 |
|  | V16 | CE4V-3E32-KO.Fabrikam.COM | 16 | 1.62184 |
|  | V17 | CE4V-3S32-RTM-1.Fabrikam.COM | 17 | 1.46187 |
| target3 | V18 | CE4P-XP32-SP3-2.Fabrikam.COM<br>CE4V-3E32-SP2-1.Fabrikam.COM<br>CE4V-3E64-R2-1.Fabrikam.COM<br>CE4V3E64R2S2-2.Fabrikam.COM | 18 | 7.05043 |
|  | V19 | CE4P-XP64-SP3-1.Fabrikam.COM | 19 | 0.30353 |

By contrast, a recommended solution using the placement-goal-based model and approach described herein is shown in the following table. As illustrated in this example, the result of consolidation based on the present model will use only two target servers and the over-all compute unit cost is 40.12, qualifying the result as an enhanced assignment 232.

| Consolidation Recommendation | Virtual Machine | Host Name | Isolation Factor | Compute Unit |
|---|---|---|---|---|
| target1 | V1 | CE4-05H-LEGACY.Fabrikam.COM<br>CE4-05H-LEGACY.Fabrikam.COM | 1 | 0.65109 |
|  | V2 | CE4-05H-NT.Fabrikam.COM<br>CE4P-3E32-R2-2.Fabrikam.COM<br>CE4V-3E32-JA.Fabrikam.COM | 2 | 3.63433 |
|  | V3 | CE4P-3E64-R2-1.Fabrikam.COM<br>CE4V-3E32-SP1-2.Fabrikam.COM<br>CE4V3E64R2S2-1.Fabrikam.COM | 3 | 3.72391 |
|  | V4 | CE4P-3E64-R2-2.Fabrikam.COM | 4 | 0.49932 |
|  | V5 | CE4P-3E32-R2-1.Fabrikam.COM | 5 | 1.49526 |
|  | V12 | CE4V-3E32-PT-BR.Fabrikam.COM<br>CE4V-3E32-SP1-1.Fabrikam.COM<br>CE4V3S32R2S2-2.Fabrikam.COM | 12 | 3.75958 |
|  | V13 | CE4V3E32R2S2-1.Fabrikam.COM<br>CE4V-3S32-R2-1.Fabrikam.COM | 13 | 1.71079 |
|  | V14 | CE4P-XP32-SP3-1.Fabrikam.COM | 14 | 1.00048 |
|  | V15 | CE4V-3E32-DE.Fabrikam.COM | 15 | 2.43645 |
|  | V16 | CE4V-3E32-KO.Fabrikam.COM | 16 | 1.62184 |
|  | V17 | CE4V-3S32-RTM-1.Fabrikam.COM | 17 | 1.46187 |
| target2 | V6 | CE4V-3S32-SP1-3.Fabrikam.COM | 6 | 1.65957 |
|  | V7 | CE4P-8EIA64-01.Fabrikam.COM<br>CE4V3E64R2S2-3.Fabrikam.COM | 7 | 1.64219 |

-continued

| Consolidation Recommendation | Virtual Machine | Host Name | Isolation Factor | Compute Unit |
|---|---|---|---|---|
| | V8 | CE4V-3E32-R2-1.Fabrikam.COM | 8 | 1.59357 |
| | V9 | CE4V-3E32-RTM-1.Fabrikam.COM<br>CE4V-3E64-R2-2.Fabrikam.COM | 9 | 2.00143 |
| | v10 | CE4P-8EIA64-01.Fabrikam.COM | 10 | 2.4752 |
| | V11 | CE4V3E32R2S2-2.Fabrikam.COM | 11 | 0.63717 |
| | V18 | CE4P-XP32-SP3-2.Fabrikam.COM<br>CE4V-3E32-SP2-1.Fabrikam.COM<br>CE4V-3E64-R2-1.Fabrikam.COM<br>CE4V3E64R2S2-2.Fabrikam.COM | 18 | 7.05043 |
| | V19 | CE4P-XP64-SP3-1.Fabrikam.COM | 19 | 0.30353 |
| | V20 | CE4P-XP64-SP3-2.Fabrikam.COM | 20 | 0.64769 |

Thus, a solution using an implementation algorithm based on the embodiments' model will use only two target servers while the present solution based on a linear-additive algorithm will use three target servers. A benefit factor of the present model's approach can be calculated as $$\frac{C_{additive} - C_{present}}{C_{additive}} = \frac{52.90 - 40.12}{52.90} = 24.16\%$$

That is, 24.16% of server compute unit cost is saved by applying the algorithm provided by this present model.

By way of further example, in some embodiments an implementation uses the following definitions:

A Source's Total CU (Computing Unit) is given by data from spec dot org. In some variations, this data is per processor and in some it is not.

Source's Needed CU=Source's Total CU*% processor time.

Source's Needed CU in VM (Virtual Machine) scenario=Source's Total CU*% processor time*(1+10%).

Source's Needed Memory=data on memory used from MAP (Microsoft® Assessment and Planning toolkit) output.

Target physical machine's Total CU=data from spec dot org. In some variations, this data is per processor and in some it is not.

VM's CU: if (VM's # of virtual processors<=# of processors on the physical machine), then VM's CU=(Physical machine's total CU)/(# of processors)*(# of virtual processors); else, VM's CU=Physical machine's total CU.

VM's Memory: With a current VM table, VM's memory will=((startup+max)/2+max)/2, whether dynamic memory=yes or no.

Spun-up physical machine's left-over CU=Total CU*Max %−Sum of CU of all source servers that have already been consolidated to that machine.

Spun-up physical machine's left-over Memory for Instance scenario=Total Memory−Sum of Memory of all source servers that have already been consolidated to that machine.

Spun-up physical machine's left-over Memory for VM scenario=Total Memory−Memory VM Overhead−Sum of Memory of all source servers that have already been consolidated to that machine.

Minimally-cushioned VM Type: If multiple VM Types can accommodate, chose the smallest one.

Bearing these definitions in mind, in a VM scenario, for example, the following approach can be utilized:

Take a source server (by sequence number) and find a VM type that is allowed by the target pool that the source is assigned to, bearing in mind that the VM type should be able to fit the source's CU and Memory, minimally-cushioned. One check is (Source's Needed CU<=VM type's CU && Source's Needed Memory<=VM's Memory).

If a VM type is found, then try to fit into physical machines: Take that same source server's CU and the VM type's memory, try to fit those two numbers into each of the already-spun-up physical machines' left-over CU and left-over Memory for VM scenario, assuming that the "max number allowed per server" is not reached yet. The already-spun-up physical machines in the previous sentence refer to the specific target pool that the source server is assigned to. If there's no assignment, then use a default pool. If none of the spun-up physical machines can fit the two numbers, then spin up a new physical machine. If none of the existing or new physical server can fit, then the configuration is not consolidated.

Else: if a VM type is not found, then the configuration is not consolidated. This concludes the VM scenario example.

In an Instance scenario, for example, the following approach can be utilized:

Take a source server (by sequence number) and try to fit into physical machines: Take that source server's CU and memory, try to fit those two numbers into each of the already-spun-up physical machines' left-over CU and left-over Memory for instance scenario, assuming that the "max number allowed per server" is not reached yet. The already-spun-up physical machines in the previous sentence refer to the specific target pool that the source server is assigned to. If there's no assignment, then use a default pool. If none of the spun-up physical machines can fit the two numbers, then spin up a new physical machine. If the attempt to fit physical machines fails, in that none of the existing or new physical server can fit, then the configuration is not consolidated. This concludes the Instance scenario example.

With respect to workflow, some embodiments are consistent with a workflow which can be summarized as follows in terms of events and directional connections indicating flow among the events. The workflow events may also be characterized in various ways. The workflow events and their characterizations (shown in parentheses) are:

A: Run MAP tool to get environmental data (Input Preparation, Database Infrastructure).

B: Import MAP output (Input Preparation, Database Infrastructure).

C: Enter consolidation parameters for sources as input (Input Preparation, Database Infrastructure).

D: Enter consolidation parameters for targets as input (Input Preparation, Database Infrastructure).

E: Calculate Consolidation Recommendations (Calculation, Database Infrastructure).

F: Consolidate Some or All Servers (Consumption, Database Servers).

The following connections specify possible workflow between these workflow events: A→B, B→C, C→D, D→E, E→A, E→C, E→F, F→A, F→B, F→C, F→D. The foregoing textual description of the workflow can also be visualized as a graphic, by drawing nodes labeled with the event description and drawing directed arcs between the nodes to match the connections listed in this paragraph.

With respect to other visualizations, one visualization of consolidation tool interaction components indicates data flow to a tool from MAP output, user input, user settings, application settings, and benchmark data. The visualization also indicates data flow from the tool in the form of consolidation recommendations.

As another data flow visualization, source info and target info each flow into a "generate recommendations" node, from which consolidation recommendations flow.

As to source info, MAP output flows along a "CPU model, processor speed, # of processors, # of cores" arc from a "Get data from MAP" node to a "Get Compute Unit" node. Benchmark data also flows into the "Get Compute Unit" node. CU flows out of this "Get Compute Unit" node to the "generate recommendations" node. A "CPU % Processor Time" arc flows from the "Get data from MAP" node to the "generate recommendations" node. A "Memory Committed" arc flows from the "Get data from MAP" node to the "generate recommendations" node. A "Disk Space Usage" arc flows from the "Get data from MAP" node to a "Code" node. "Config File" data flows into each of two "Code" nodes. One of the "Code" nodes also receives "Memory Committed" and provides "Technical Factor 1" to an "Excel Formula" node. The other "Code" node also receives "Disk Space Usage" and provides "Technical Factor 2" to the "Excel Formula" node. "Other Business Factors and Technical Factors" also flow into the "Excel Formula" node. The "Excel Formula" node provides a "Sequence #" arc which flows into the "generate recommendations" node. An "Other User Inputs, e.g., Assigned Target Pool, Exclusion, etc." arc also flows into the "generate recommendations" node.

As to target info, a "CPU model, processor speed, # of processors, # of cores" arc flows into a "Get Compute Unit" node, from which "CU" flows to the "generate recommendations" node. Also flowing into the "generate recommendations" node as target info are arcs labeled "Max CPU Utilization %", "Memory Total", "Guest Machine Info: VM Types, CPU and Memory", and "Other Target Pool Data, e.g., Default Target Pool, Pool Number/Name, etc."

As with the other examples herein, the foregoing visualizations are merely illustrative, and thus are not necessarily consistent with every embodiment.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 through 6 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-readable storage medium configured with data and with instructions that when executed by at least one processor causes the processor(s) to perform a process for facilitating database instance consolidation, the process comprising the steps of:

obtaining standardized database instance performance data for database instances running on source machines;

receiving at least one database instance isolation criterion, wherein at least one isolation criterion includes at least one of the following: (a) a security factor indicating that specified instances shall not co-reside on a target machine, (b) an organizational factor indicating that specified instances shall be located together in a single data center, (c) a compatibility factor indicating that specified instances shall not reside in the same virtual machine, (d) a compatibility factor indicating that specified instances shall not reside in the same physical server, or (e) a compatibility factor indicating that specified instances shall not reside in the same server pool;

applying at least one received database isolation criterion to automatically divide database instances into instance sets;

determining a resource usage for each instance set; and
automatically assigning instance sets to target machines based on instance set resource usage and target machine resource capacity.

2. The configured medium of claim 1, wherein at least one of the following is received as a database instance isolation criterion:
a security isolation criterion indicating that specified instances shall not co-reside on a target machine;
an organizational isolation criterion indicating that specified instances shall be located together in a single data center.

3. The configured medium of claim 1, wherein determining a resource usage for each instance set comprises rounding up to a multiple of a predetermined utilization unit.

4. The configured medium of claim 1, wherein assigning instance sets to target machines comprises sorting target machines by resource capacity.

5. The configured medium of claim 1, wherein assigning instance sets to target machines comprises utilizing an additive linear approach.

6. The configured medium of claim 1, wherein the process further comprises associating each instance set with a virtual machine, and assigning instance sets includes assigning virtual machines to target machines.

7. The configured medium of claim 6, wherein determining a resource usage for each instance set comprises finding a virtual machine resource usage for each virtual machine.

8. The configured medium of claim 1, wherein assigning instance sets to target machines comprises entering at least one isolation criterion into a spreadsheet program.

9. A process for placement goal-based database instance consolidation, the process comprising the steps of:
gathering database instance performance data for database instances running on source machines;
standardizing gathered performance data;
entering into a user interface of a consolidation tool at least one database instance placement goal in the form of at least one isolation criterion, wherein at least one isolation criterion includes at least one of the following: (a) a security factor indicating that specified instances shall not co-reside on a target machine, (b) an organizational factor indicating that specified instances shall be located together in a single data center, (c) a compatibility factor indicating that specified instances shall not reside in the same virtual machine, (d) a compatibility factor indicating that specified instances shall not reside in the same physical server, or (e) a compatibility factor indicating that specified instances shall not reside in the same server pool;
identifying target machine characteristics to the consolidation tool;
commanding the consolidation tool to apply one or more database isolation criteria to the standardized performance data and the target machine characteristics; and
getting from the consolidation tool as an output an assignment of instances to target machines.

10. The process of claim 9, wherein standardizing gathered performance data includes at least one of the following:
setting a Needed Compute Unit to a Normalized CPU Capacity times a Processor Time Percentage;
setting Needed Compute Unit to a Normalized CPU Capacity times a Processor Time Percentage times a multiplier which exceeds one;
setting a Virtual Machine Compute Unit to a Target Machine Compute Unit divided by a Target Machine Number of Processors and times a Virtual Machine Number of Processors, when Virtual Machine Number of Processors does not exceed Target Machine Number of Processors;
setting a Virtual Machine Compute Unit to a Target Machine Compute Unit when a Virtual Machine Number of Processors exceeds a Target Machine Number of Processors;
setting a Virtual Machine Memory Usage based on a Virtual Machine Startup Memory Allocation and a Virtual Machine Maximum Memory Allocation.

11. The process of claim 9, wherein the entering step comprises entering at least one isolation criterion into a spreadsheet program, and the spreadsheet program serves as at least a portion of the user interface of the consolidation tool.

12. The process of claim 9, wherein the getting step gets an assignment of instances for at least one of the following situations:
source machines are treated as being located in multiple data centers and target machines are treated as being located in multiple data centers;
source machines are treated as being located in multiple data centers and target machines are treated as being located in a single data center;
source machines are treated as being located in a single data center and target machines are treated as being located in multiple data centers;
source machines are treated as being located in a single data center and target machines are treated as being located in a single data center.

13. The process of claim 9, wherein the entering step comprises entering at least two isolation criteria.

14. The process of claim 9, wherein the entering step comprises entering a security isolation criterion which indicates that specified instances shall not co-reside on a target machine.

15. The process of claim 9, wherein the entering step comprises entering an organizational isolation criterion which indicates that specified instances shall be located together in a single data center.

16. A computer system configured to assist database instance consolidation, the system comprising:
a logical processor;
a memory in operable communication with the logical processor;
at least one database instance isolation criterion residing in the memory; and
database instance consolidation code residing in the memory and capable of automatically applying the database isolation criterion to divide database instances into instance sets and capable of automatically assigning instance sets to target machines based on instance set resource usage and target machine resource capacity, wherein at least one isolation criterion includes at least one of the following: (a) a security factor indicating that specified instances shall not co-reside on a target machine, (b) an organizational factor indicating that specified instances shall be located together in a single data center, (c) a compatibility factor indicating that specified instances shall not reside in the same virtual machine, (d) a compatibility factor indicating that specified instances shall not reside in the same physical server, or (e) a compatibility factor indicating that specified instances shall not reside in the same server pool.

17. The system of claim 16, wherein the system is further characterized by standardized database instance performance data residing in the memory, and the database instance consolidation code is also capable of determining a resource usage for each instance set based on the performance data.

18. The system of claim 16, wherein the database instance consolidation code comprises a spreadsheet program which is programmed to automatically assign instance sets to target machines based on instance set resource usage and target machine resource capacity.

19. The system of claim 16, wherein the database instance consolidation code is programmed to assign instance sets to target machines based at least in part on an additive linear calculation model.

20. The system of claim 16, further characterized in that a particular Needed Compute Unit resides in the memory, namely, a Needed Compute Unit which is defined as a Normalized CPU Capacity times a Processor Time Percentage.

* * * * *